March 4, 1924.                                          1,485,879
                       J. W. PAGE
            DETACHABLE TOOTH FOR EXCAVATING SHOVELS
                  Filed Aug. 3, 1923      2 Sheets-Sheet 1
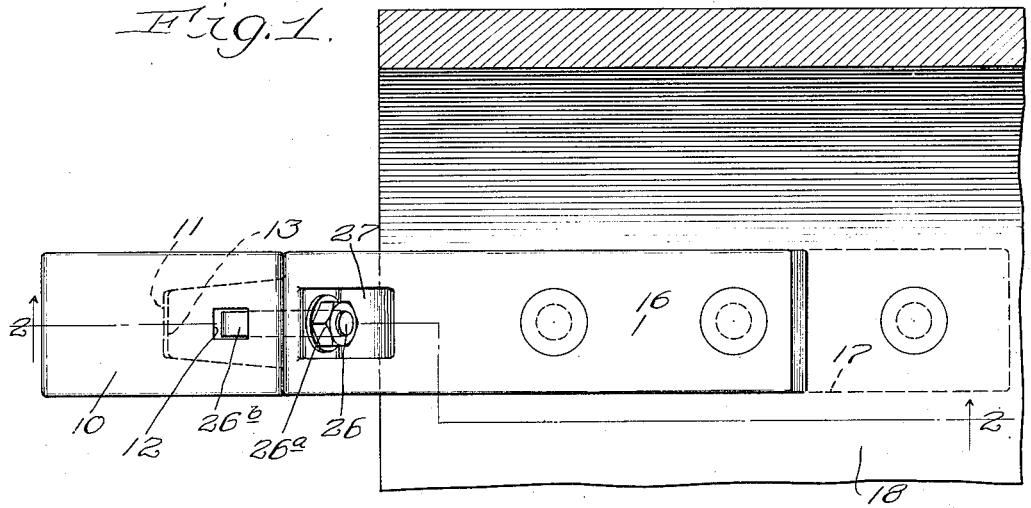
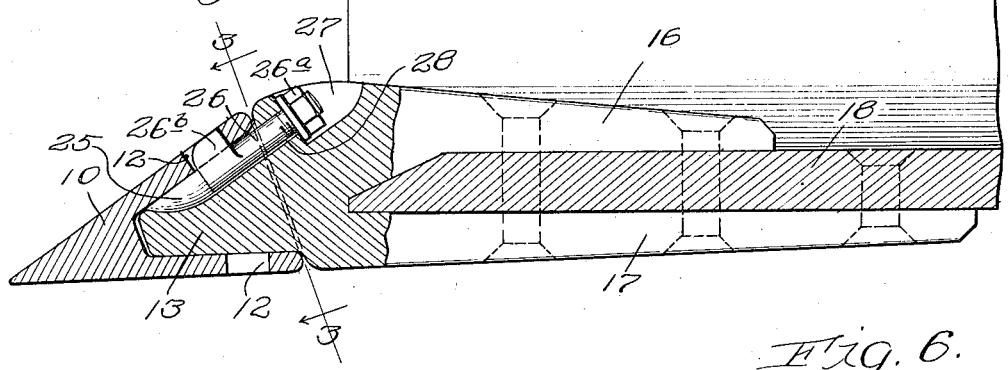
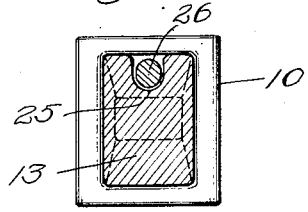
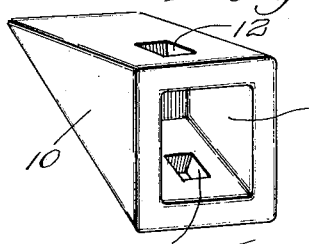
Inventor:
John W. Page, March 4, 1924.
J. W. PAGE
DETACHABLE TOOTH FOR EXCAVATING SHOVELS
Filed Aug. 3, 1923
1,485,879
2 Sheets-Sheet 2
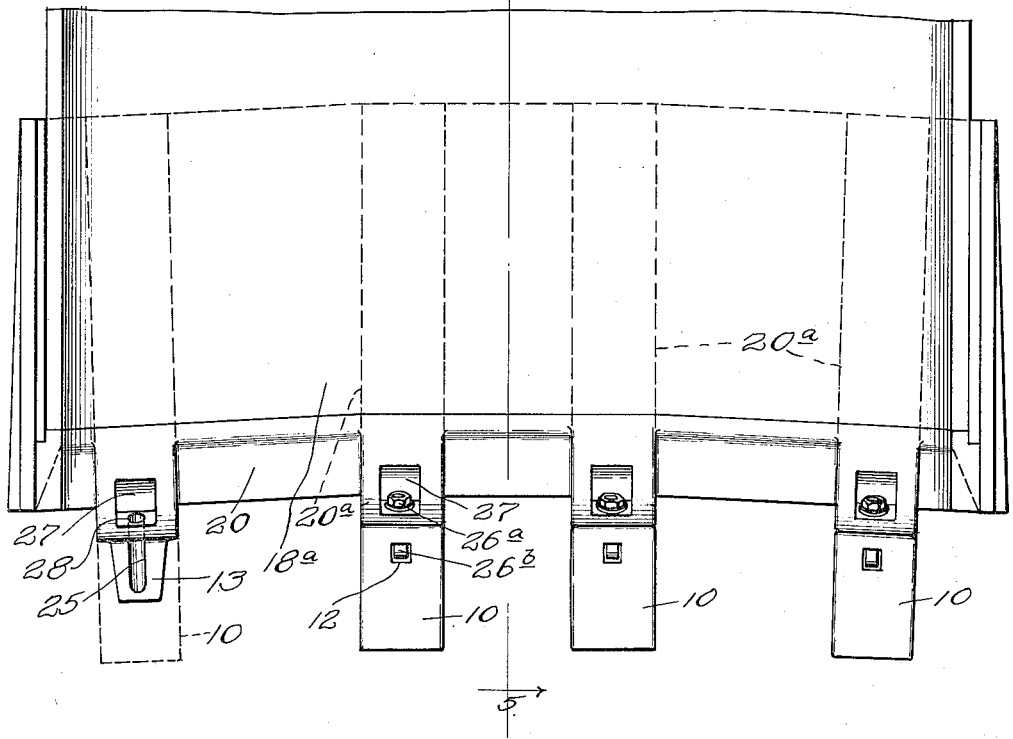
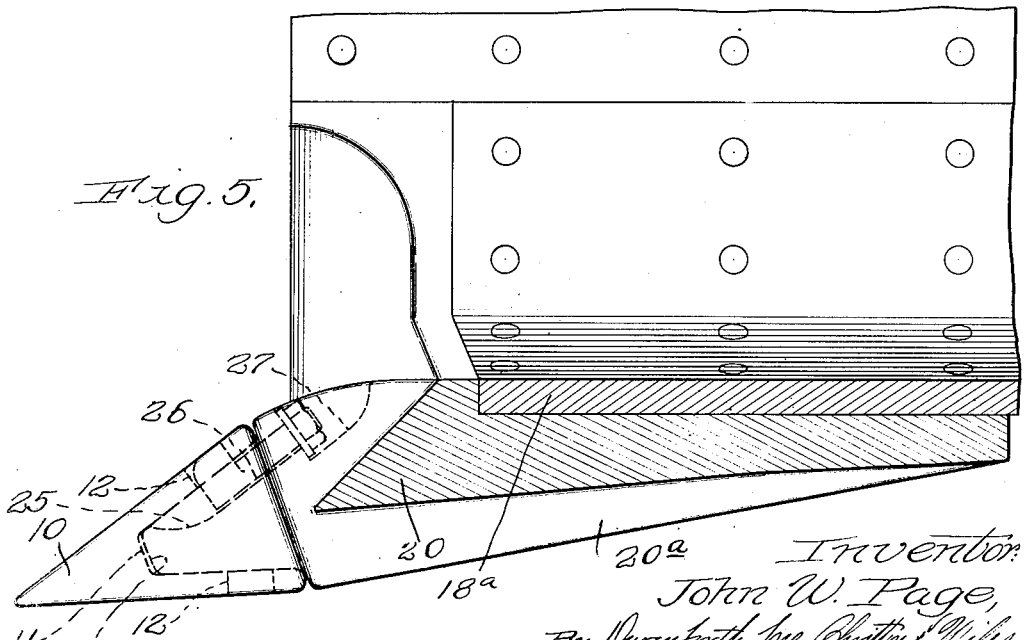

Patented Mar. 4, 1924.

1,485,879

UNITED STATES PATENT OFFICE.

JOHN W. PAGE, OF CHICAGO, ILLINOIS.

DETACHABLE TOOTH FOR EXCAVATING SHOVELS.

Application filed August 3, 1923. Serial No. 655,489.

*To all whom it may concern:*

Be it known that I, JOHN W. PAGE, a citizen of the United States, residing at Chicago, in the county of Cook and State of Illinois, have invented a new and useful Improvement in Detachable Teeth for Excavating Shovels, of which the following is a specification.

This invention relates to improvements in detachable teeth for excavating shovels. The tooth here shown is of the kind commonly used on the forward or cutting edge of excavating shovels, buckets, dredges and other excavating devices. Such teeth, in use, receive very hard usage, and it therefore is desirable to make them detachable so they may be replaced. My improved tooth is so constructed that it may be readily and quickly attached to a shovel or detached therefrom. It is strong and rugged in construction and the means of attachment hold it securely in place. The attachment is effected by only one bolt, which is easily accessible, and still out of the way and protected from damage in use. Other features and advantages of my invention will appear more fully as I proceed with my specification.

In that form of device embodying the features of my invention shown in the accompanying drawings:

Figure 1 is a top plan view of one of my improved detachable teeth showing the same mounted on the forward edge of an excavating shovel, Fig. 2 is a view taken as indicated by the line 2 of Fig. 1, Fig. 3 is a view taken as indicated by the line 3 of Fig. 2, Fig. 4 is a top plan view of a plurality of my improved teeth showing a slightly different form of support therefor, Fig. 5 is a view taken as indicated by the line 5 of Fig. 4, and Fig. 6 is a view in perspective showing one of the detachable teeth removed from its support.

As shown in the drawings, the detachable tooth itself, as indicated by 10, is wedge-shaped and provided with a square tapered socket 11. The upper face and the lower face of the tooth are each provided with a square opening 12 extending through to the socket 11. The tooth 10 is symmetrical so that either side having a hole 12 may be uppermost.

The recess or socket 11 in the tooth 10 is adapted to receive the tooth support or lug 13 which is squared and tapered and shaped to fit the recess 11 so that when the tooth is drawn up on the lug it will engage the four sides thereof. The lug 13 is short enough to permit the tooth to be drawn up until the lug becomes firmly seated in the socket 11.

The lugs 13 may be attached to the shovel by any desired supporting means. In Figs. 1 and 2, I have shown individual supporting means for each lug comprising an upper arm 16 and a lower parallel arm 17 adapted to be secured in any convenient manner to the bottom 18 of the shovel. If desired, however, a plurality of lugs 13 may be formed on a member 20 (as shown in Figs. 4 and 5) adapted to be fastened to the bottom of a shovel which is indicated by 18ª in Figs. 4 and 5.

The following means are provided for attaching the tooth 10 to the lug 13. The upper surface of the lug 13 is provided with a groove 25 adapted to accommodate a bolt 26. A short distance above the upper end of the groove 25, the lug 13 is considerably enlarged and provided with a recess 27 adapted to accommodate the nut 26ª of the bolt 26. A circular hole 28 forms a continuation of the groove 25 into the recess 27. The bolt 26 is provided with a small lug 26ᵇ adapted to engage one of the openings 12 in the tooth 10.

When the parts are in position, as shown in Fig. 2, it is obvious that tightening of the nut 26ª will draw the tooth 10 tightly up onto the lug 13. The nut is readily accessible without turning the shovel over and is also protected from damage by lying in the recess 27. If the tooth becomes loose, a slight tightening of the nut 26ª will serve to draw it tighter onto the lug 13. Either of the holes 12 may be placed uppermost for engagement by the bolt. As stated before, the lugs 13 may be attached to the shovel by forming them on a member 20 adapted to be fastened to the bottom of the shovel, as shown in Figs. 4 and 5. This member 20 is a single piece of cast metal and extends across and covers the entire front edge of the bottom of the shovel. It is provided with a plurality of longitudinally extending ribs 20ª formed integrally therewith; and the ends of these ribs project beyond the front edge of the shovel and carry the lugs 13.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A device of the character described comprising a tapered tooth-supporting lug, a detachable tooth provided with a complementary tapered recess adapted to embrace the tapered end of the lug, and means for drawing the tooth onto the lug, said means comprising a bolt arranged substantially parallel with the longitudinal axis of the lug and having one end engaged with a part on the lug and the other with a part on the tooth, whereby tightening of the bolt causes a seating of the tapered tooth-supporting lug in the complementary tapered recess in the tooth.

2. A device of the character described comprising a single piece cast metal front for excavating shovels, the same having a plurality of longitudinally extending ribs formed integrally therewith, each rib carrying at its end a tapered tooth-supporting lug, a detachable tooth provided with a complementary tapered recess adapted to embrace the tapered end of the lug, and means for drawing the tooth onto the lug, said means comprising a bolt arranged substantially parallel with the longitudinal axis of the lug, and having one end engaged with a part on the lug and the other with a part on the tooth, whereby tightening of the bolt causes a seating of the tapered tooth-supporting lug in the complementary tapered recess in the tooth.

In witness whereof I have hereunto set my hand and seal this 31 day of July, 1923.

JOHN W. PAGE. [L. S.]